US006938088B1

(12) United States Patent
Hericourt

(10) Patent No.: US 6,938,088 B1
(45) Date of Patent: Aug. 30, 2005

(54) METHOD AND SYSTEM FOR CACHING HTTP DATA TRANSPORTED WITH SOCKS DATA IN IP DATAGRAMS

(75) Inventor: Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 09/678,908

(22) Filed: Oct. 4, 2000

(30) Foreign Application Priority Data

Oct. 21, 1999 (EP) .................................. 99480100

(51) Int. Cl.[7] ............................................. G06F 15/16
(52) U.S. Cl. ...................... 709/227; 709/217; 709/230; 709/238; 370/475
(58) Field of Search ............................... 709/201, 203, 709/218, 224–230, 219, 217, 238, 240; 713/201

(56) References Cited

U.S. PATENT DOCUMENTS

| 5,941,988 | A | * | 8/1999 | Bhagwat et al. ............ 713/201 |
|---|---|---|---|---|
| 5,944,823 | A | * | 8/1999 | Jade et al. ................... 713/201 |
| 6,032,193 | A | * | 2/2000 | Sullivan ...................... 709/238 |
| 6,195,366 | B1 | * | 2/2001 | Kayashima et al. ......... 709/227 |
| 6,331,984 | B1 | * | 12/2001 | Luciani ....................... 370/401 |
| 6,389,462 | B1 | * | 5/2002 | Cohen et al. ................ 709/218 |
| 6,661,799 | B1 | * | 12/2003 | Molitor ........................ 713/201 |
| 6,683,873 | B1 | * | 1/2004 | Kwok et al. ................. 709/217 |
| 6,823,393 | B1 | * | 11/2004 | Hericourt .................... 709/230 |
| 6,862,629 | B1 | * | 3/2005 | Hericourt .................... 709/238 |

* cited by examiner

Primary Examiner—Ario Etienne
Assistant Examiner—Ramy Osman
(74) Attorney, Agent, or Firm—Jerry W. Herndon; Yee & Associates, P.C.

(57) ABSTRACT

The present invention is directed to computer networks and more particularly to a system and method in a network device for caching Hyper Text Transfer Protocol (HTTP) data transported in an Internet Protocol (IP) Datagram sent on a socks connection established over a Transmission Control Protocol (TCP) connection between a source port on a source device and a destination port on a destination device.

20 Claims, 11 Drawing Sheets

Socks IP Router Caching Socks Traffic

Logical View of an End User Accessing the World-Wide-Web

General Physical View of an End User Accessing the World-Wide-Web

Internal Table of the Socks Cache Extension

METHOD AND SYSTEM FOR CACHING HTTP DATA TRANSPORTED WITH SOCKS DATA IN IP DATAGRAMS

TECHNICAL FIELD OF THE INVENTION

The present invention relates to computer networks, and more particularly to a method and system for caching HTTP data transported with Socks data in an Internet Protocol (IP) Datagram.

BACKGROUND OF THE INVENTION

The Internet is a global network of computers and computer networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet transmitting and receiving electronic mail,
logging into remote computers (the "Telnet"), and
transferring files and programs from one computer to another ("FTP" or "File Transfer Protocol").

The TCP/IP protocol suite is named for two of the most important protocols:

a Transmission Control Protocol (TCP), and
an Internet Protocol (IP).

Another name for it is the Internet Protocol Suite. The more common term TCP/IP is used to refer to the entire protocol suite. The first design goal of TCP/IP is to build an interconnection of networks that provide universal communication services: an internetwork, or internet. Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network.

TCP is a transport layer protocol providing end to end data transfer. It is responsible for providing a reliable exchange of information between 2 computer systems. Multiple applications can be supported simultaneously over one TCP connection between two computer systems.

IP is an internetwork layer protocol hiding the physical network architecture below it. Part of the communicating messages between computers is a routing function that ensures that messages will be correctly directed within the network to be delivered to their destination. IP provides this routing function. An IP message is called an IP Datagram.

Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

A "Router" is a computer that interconnects two networks and forwards messages from one network to the other. Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term "IP Router" is often used. However, dedicated network hardware devices called "Routers" can provide more sophisticated routing functions than the minimum functions implemented in IP.

With the increasing size and complexity of the Internet, tools have been developed to help find information on the network, often called navigators or navigation systems. Navigation systems that have been developed include standards such as Archie, Gopher and WAIS. The World Wide Web ("WWW" or "the Web") is a recent superior navigation system. The Web is:

an Internet-based navigation system,
an information distribution and management system for the Internet, and
a dynamic format for communicating on the Web.

The Web seamlessly, for this use, integrates format of information, including still images, text, audio and video. A user on the Web using a graphical user interface ("GUI", pronounced "gooey") may transparently communicate with different host computers on the system, and different system applications (including FTP and Telnet), and different information formats for files and documents including, for example, text, sound and graphics.

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. The Web uses a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages. Web clients when browsing:

convert user specified commands into HTTP GET requests, connect to the appropriate Web server to get information, and wait for a response. The response from the server can be the requested document or an error message.

After the document or an error message is returned, the connection between the Web client and the Web server is closed.

The first version of HTTP is a stateless protocol. That is with HTTP, there is no continuous connection between each client and each server. The Web client using HTTP receives a response as HTML data or other data. This description applies to version 1.0 of HTTP protocol, while the new version 1.1 breaks this barrier of stateless protocol by keeping the connection between the server and client alive under certain conditions.

After receipt, the Web client formats and presents the data or activates an ancillary application such a sound player to present the data. To do this, the server or the client determines the various types of data received. The Web Client is also referred to as the Web Browser, since it in fact browses documents retrieved from the Web Server.

The host or computers names (like www.entreprise.com) are translated into numeric Internet addresses (like 194.56.78.3), and vice versa, by using a method called DNS ("Domain Name Service"). DNS is supported by network-resident servers, also known as domain name servers or DNS servers.

Some companies use the same mechanism as the Web to communicate inside their own corporation. In this case, this mechanism is called an "Intranet". These companies use the same networking/transport protocols and locally based Web servers to provide access to vast amounts of corporate information in a cohesive fashion. As this data may be private to the corporation, and because the members of the company still need to have access to public Web information, to avoid people not belonging to the company from accessing this private Intranet through the public Internet, intranets may be protected by using special equipment called a Firewall.

A Firewall protects one or more computers with Internet connections from access by external computers connected to the Internet. A Firewall is a network configuration, usually created by hardware and software, that forms a boundary between networked computers within the Firewall from those outside the Firewall. The computers within the Firewall form a secure sub-network with internal access capabilities and shared resources not available from the outside computers.

Often, the access to both internal and external computers is controlled by a single machine, said machine comprising the Firewall. Since the computer, on which the Firewall is, directly interacts with the Internet, strict security measures against unwanted access from external computers are required.

A Firewall is commonly used to protect information such as electronic mail and data files within a physical building or organization site. A Firewall reduces the risk of intrusion by unauthorized people from the Internet. The same security measures can limit or require special software for people inside the Firewall who wish to access information on the outside. A Firewall can be configured using "Proxies" or "Socks" to control the access to information from each side of the Firewall.

A HTTP Proxy is a special server that typically runs in conjunction with Firewall software and allows access to the Internet from within a Firewall. The Proxy Server waits for a request (for example a HTTP request) from inside the Firewall, forwards the request to the remote server outside the Firewall, reads the response, and sends the response back to the client.

A single computer can run multiple servers, each server connection identified with a port number. A Proxy Server, like an HTTP Server or a FTP Server, occupies a port. Typically, a connection uses standardized port numbers for each protocol (for example, HTTP=80 and FTP=21). That is why an end user has to select a specific port number for each defined Proxy Server. Web Browsers usually let the end user set the host name and port number of the Proxy Servers in a customizable panel. Protocols such as HTTP, FTP, Gopher, WAIS, and Security can usually have designated Proxies. Proxies are generally preferred over Socks for their ability to perform caching, high-level logging, and access control, because they provide a specific connection for each network service protocol.

HTTP is an Application Level protocol used by the TCP connections between WEB Browsers and HTTP Proxy Servers. Consequently, IP Datagrams exchanged between the WEB Browsers and HTTP Proxy Servers comprises HTTP data. Since HTTP Proxy Servers manage the HTTP connections, they see and handle the HTTP data comprised in the IP Datagrams. When a HTTP Proxy Server receives from a source system (a WEB Browser) a request to retrieve HTTP data (a WEB page) located on a destination system (a WEB server), two situations can occur depending on whether the requested HTTP data is already stored in a local cache, or not.

If the requested HTTP data is already located in the local cache, the HTTP Proxy Server immediately sends a response to the source system with the data stored in the cache.

If the requested HTTP data is not located in the local cache, the HTTP Proxy Server forwards the request to the destination WEB system (the WEB server). When the HTTP Proxy Server receives from this destination WEB system (the WEB Server) the response comprising the HTTP data (the WEB page), it caches said HTTP data (the WEB page) in its local cache, and forwards the response to the source system (the WEB Browser).

When HTTP data is already located within the cache, the request does not need to be forwarded by the HTTP Proxy Server to the destination WEB system. A response is immediately returned by the HTTP Proxy server.

The HTTP Caching provides several advantages:

The response time of the HTTP service is improved. The HTTP Proxy Server immediately answers the request to retrieve HTTP data when said HTTP data is already stored in the cache of the HTTP Proxy Server.

The utililization of network resources is optimized. No traffic is required between the HTTP Proxy server and the destination WEB system for requested HTTP data already stored in the cache.

Socks is a protocol which does some form of encapsulation of Application Level protocols (for instance FTP, Telnet, Gopher, HTTP). Using Socks, the Application Level traffic between a system running a Socks Client software and a system running a Socks Server software is encapsulated in a virtual Socks tunnel between both systems. Socks is mainly used by systems within an Intranet in order to gain a secure access to systems located outside the Intranet.

A Socks Server acts as a relay between the systems within the Intranet and the systems outside the Intranet, thus hiding the internal systems from the external Internet. It is considered as one form of Firewall.

A Socks Server (also called Socks Gateway) is software that allows computers inside a Firewall to gain access to the Internet. A Socks Server is usually installed on a server positioned either inside or on the Firewall. Computers within the Firewall access the Socks Server as Socks Clients to reach the Internet. Web Browsers usually let the end user set the host name and port number of the Socks Servers in a customizable panel. On some Operating Systems, the Socks Server is specified in a separate file (e.g. socks.conf file). As the Socks Server acts a layer underneath the protocols (HTTP, FTP, . . . ), it cannot cache data (as Proxy does), because it doesn't decode the protocol to know what kind of data it transfers.

The problem to be solved by the present invention is to cache HTTP data in a Socks environment.

Socks Servers are used within an Intranet to provide secure access to systems located outside the Intranet. The Socks protocol is a form of encapsulation of Application Level traffic such as HTTP, FTP, Telnet. The Socks protocol (and not HTTP) is the protocol used by TCP connections established within the Intranet between WEB Browsers and Socks Servers. Consequently, IP Datagrams exchanged between WEB Browsers and Socks Servers comprise Socks data. In a Socks environment, IP routers and network devices within the Intranet only see and handle Socks traffic. As a consequence, all Application Level protocols (including HTTP) encapsulated by Socks are not seen and are therefore not processed by any UP router and more generally by any network device within the TCP/IP network. Since HTTP data transported in IP Datagrams data are not seen by IP routers in a Socks environment, IP routers cannot cache said HTTP data.

The problem is then to cache within IP routers the HTTP data transported in IP Datagrams.

The current solutions address this problem partially:

HTTP Proxy Servers providing HTTP Caching can be used instead of Socks Servers to get access to systems outside the Intranet. The WEB Browsers within the Intranet can then be configured to have access to these systems outside the Intranet via these HTTP Proxy servers. The major drawback is:

The HTTP Proxy Servers can handle the HTTP protocol (and a few additional protocols such as FTP), but cannot handle some other protocols (such as Telnet). As a consequence, the access to systems outside the Intranet is limited to the particular protocols supported by the HTTP Proxy Server. This limitation may be a problem if a protocol not supported by the HTTP Proxy Server is required for some business activity.

A combination of Socks Servers and HTTP Proxy Servers providing HTTP Caching can be used to get access to systems outside the Intranet. The major drawback is:

The configuration of the WEB Browsers (and end user workstations) within the Intranet is then complex. Each end user workstation has to be configured with multiple information, such as the address of each HTTP Proxy Server for the main protocols (such as HTTP, FTP, and Secure HTTP), and the address of each Socks Server. This complexity sometimes results in errors in the configuration of end user workstations which can cause problems.

The Socks Servers used by end user workstations to get access to systems outside the Intranet, may be enhanced to provide HTTP Caching. The major drawback is:

The caching of HTTP data is not optimized. In particular, the utilisation of network resources within the Intranet is not reduced because the caching is done at the edge of the Intranet and not within the Intranet backbone. Since HTTP data is cached within Socks Servers, all requests to retrieve HTTP data flow across the Intranet. It is generally admitted that the closer to end user workstations the HTTP caching is, the more efficient this HTTP Caching is. The problem is that Socks Servers are usually far from end user workstations.

OBJECTS OF THE INVENTION

An object of the present invention is to cache HTTP data transported in IP Datagrams comprising Socks data.

It is another object of the present invention to optimize performance of WEB access via Socks Servers, by caching HTTP data within the Intranet network.

It is yet another object of the present invention to optimize the utilization of the Intranet network resources, by reducing the HTTP traffic within the Intranet network.

SUMMARY OF THE INVENTION

The present invention is directed to computer networks and more particularly to a system and method in a network device for caching Hyper Text Transfer Protocol (HTTP) data transported in an Internet Protocol (IP) Datagram sent on a socks connection established over a Transmission Control Protocol (TCP) connection between a source port on a source device and a destination port on a destination device. The method comprises the steps of:

identifying the source device, the destination device, the port on the source device, the port on the destination device of an incoming IP Datagram.

determining whether the incoming IP datagram is originated by a socks client or by a socks server:

If the incoming IP Datagram is originated by a socks client:
terminating the TCP connection and the socks connection;
identifying the socks connection in a table;
identifying the application level protocol associated with the socks connection referring to this table, this table comprising for each socks connection an application level protocol;
determining whether said application level protocol is HTTP or not:

If said application level protocol is HTTP:
determining whether HTTP data requested by the incoming IP Datagram is in a local cache within the network device or not:

If HTTP data requested by the incoming IP Datagram is in a local cache:
building an outgoing IP Datagram comprising requested HTTP data retrieved from the local cache;
sending said outgoing IP Datagram to the socks client originator of the incoming IP Datagram.

BRIEF DESCRIPTION OF THE DRAWINGS

The novel and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein

PREFERRED EMBODIMENT OF THE INVENTION

Figure 1:
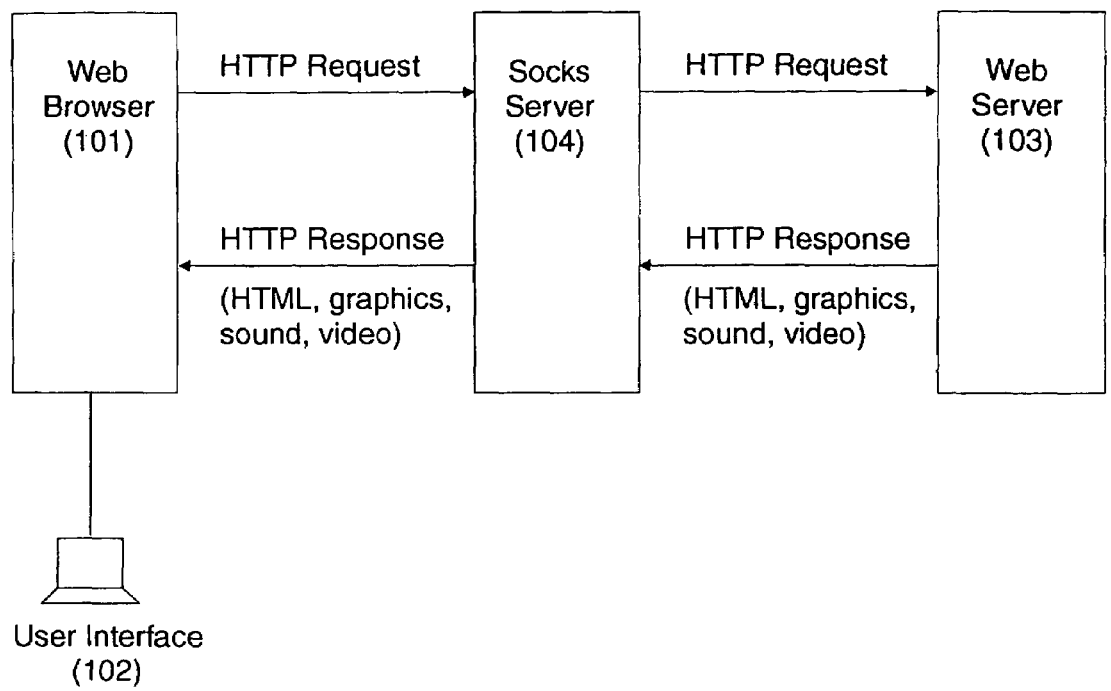
FIG. 1 is a logical view of an end user system accessing the World Wide Web, according to prior art.

FIG. 1 shows a user system with a user interface (102) comprising a Web Browser (101) for accessing the World-Wide-Web (WWW). The WWW content is transferred using the HTTP protocol. HTTP requests and responses are exchanged between the Web Browser program (101) and a destination Web Server (103) containing the WWW information the user wants to access. The Socks Server (104) between the Web Browser (101) and the Web Server (103) acts as an intermediary HTTP Relay forwarding the HTTP requests and responses to their destination. The Web Browser program (101) makes an HTTP request to the Socks Server (104) and the Socks Server forwards the request to the destination Web Server (103). The flow in the reverse direction (HTTP response) again goes via the Socks Server (104) to the Web Browser (101). In this way the Socks Server can limit the traffic to authorized transactions according to its configuration (based on some defined security and access control policy). The Socks Server hence protects the network where Web Browser is located.

Figure 2:
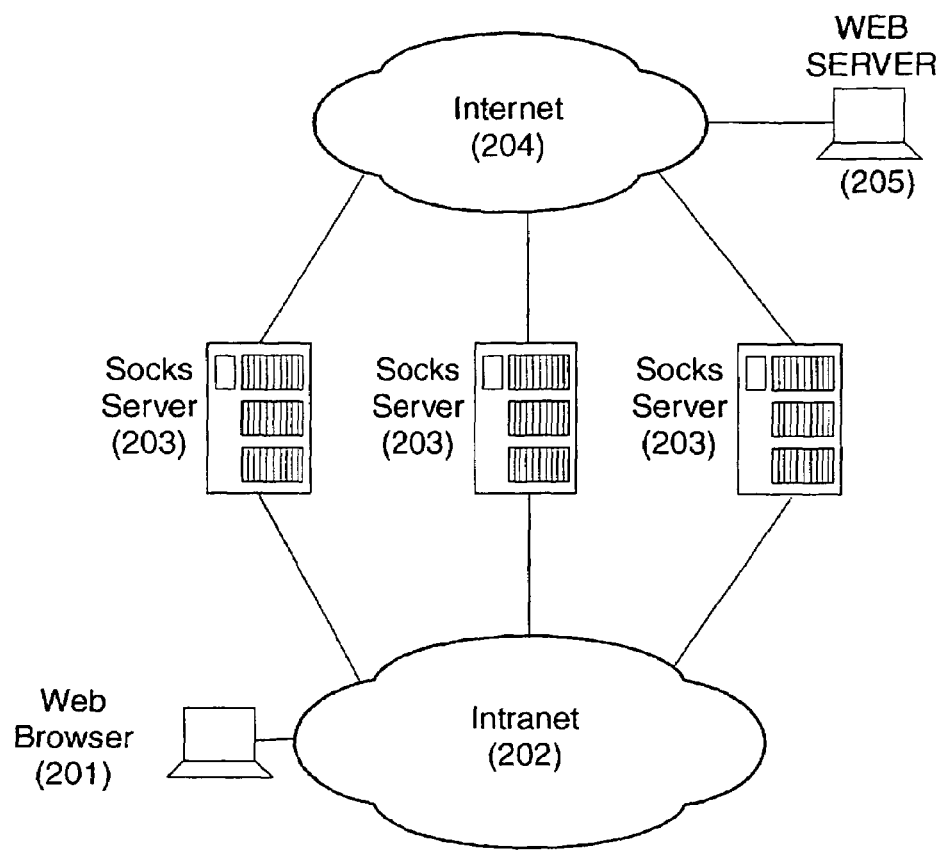
FIG. 2 is a general view of an end user system accessing the World Wide Web according to prior art.

FIG. 2 is a physical view of the set-up logically described in FIG. 1. In this particular example, the Web Browser (201) runs on a system (workstation) connected to an Intranet (202) network. The Intranet network comprises network devices such as IP Routers (206). The Socks Servers (203) protecting the Intranet connect both the (private) Intranet (202) and the (public) Internet (204). The destination Web Server (205) is also connected to the Internet. It is important to note that Socks Servers attach two networks and hence act as intermediaries for communications between said two networks. Multiple Socks Servers are often used in order to provide access robustness and load sharing.

Figure 3:
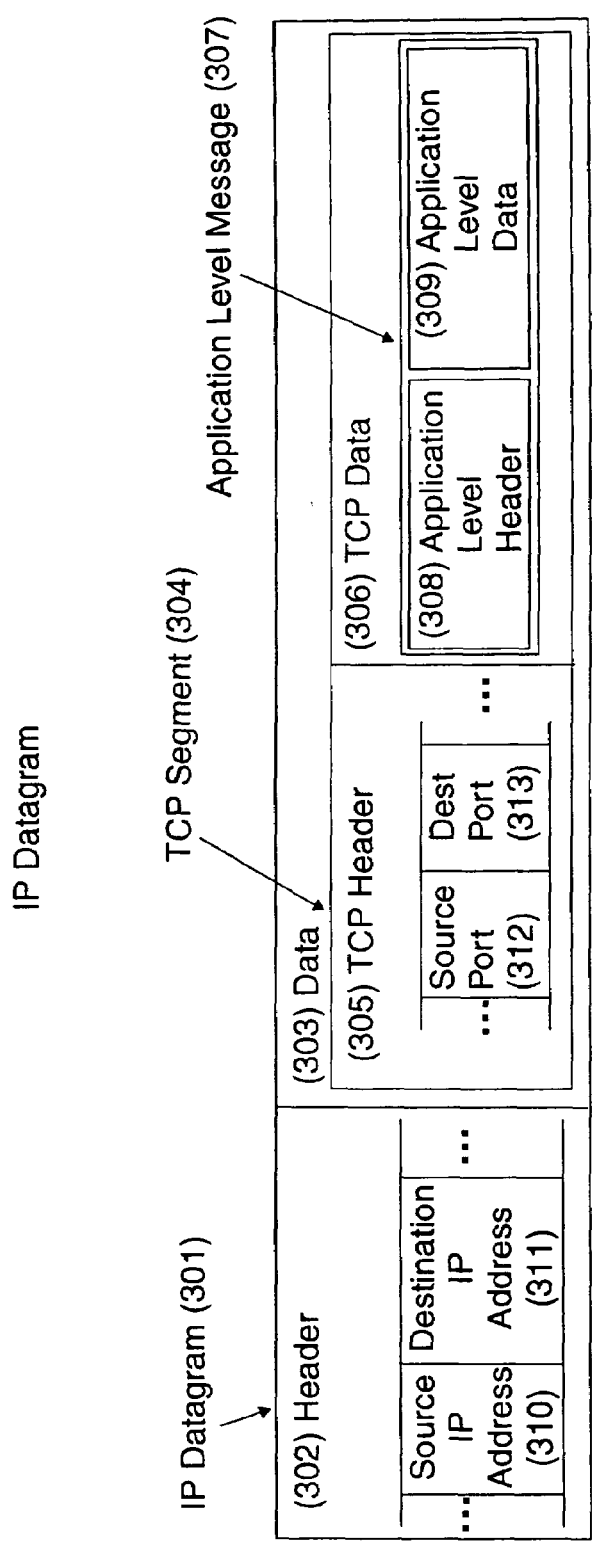
FIG. 3 shows an IP Datagram according to prior art.

The transfer unit of a data packet in TCP/IP is called an IP Datagram. It is made up of a header containing information for IP protocol and data that is only relevant to the higher level protocol. FIG. 3 shows the format of a IP Datagram, in the environment described in FIGS. 1 and 2:

(301) IP Datagram. an IP Datagram is a message exchanged between 2 computer systems across a TCP/IP network. An IP Datagram is divided in 2 parts:
a Header, and
Data.

(302) IP Datagram Header. the header comprises fields such as:
the Source IP Address (310) (the IP address of the computer which sends the IP Datagram.
the Destination IP Address (311) (the IP address of the computer which is the destination of the IP Datagram).

The IP Datagram Header is mainly used to route the IP Datagram to its final destination.

(303) IP Datagram Data. This field comprises the data sent by the originator to the destination computer system. The destination computer system processes this data. Since the TCP/IP protocol suite is organised in layers, the IP Datagram field comprises the message relevant to the higher level protocol (which is TCP in the environment related to the invention).

(304) TCP Segment. A TCP message is usually called TCP Segment.
(305) TCP Header. A TCP Header comprises fields such as the Source Port (312) and the Destination Port (313) which identify the application protocol (e.g. HTTP, FTP, Telnet, Socks) transported by TCP. This field is mainly used by the destination of the IP Datagram to determine which application must process the data transported by TCP.
(306) TCP Data. The TCP Data field comprises application data which are sent by the originator to the destination computer system. The destination computer system processes the data. Since the TCP/IP protocol suite is organised in layers, the TCP Data part contains the information relevant to the higher level protocol which is the Application level protocol (such as HTTP, FTP, Telnet, Socks).
(307) Application Level Message. The TCP Data part of the IP Datagram contains an Application Level Message. This is for example a Socks message (for instance a "CONNECT" or a "BIND" message), a HTTP message, a FTP message, or a Telnet message. Depending on the Application level protocol, this Application Level Message can also be split in 2 parts.
(308) Application Level Header. The Application Level Header is the header relevant to the application protocol such as HTTP, FTP, Telnet.
(309) Application Level Data. This is the data part which is processed by the application responsible of handling the Application Level protocol. This is usually the data which is directly relevant to the end user (for instance, data entered by an end user on his workstation).

Figure 4:
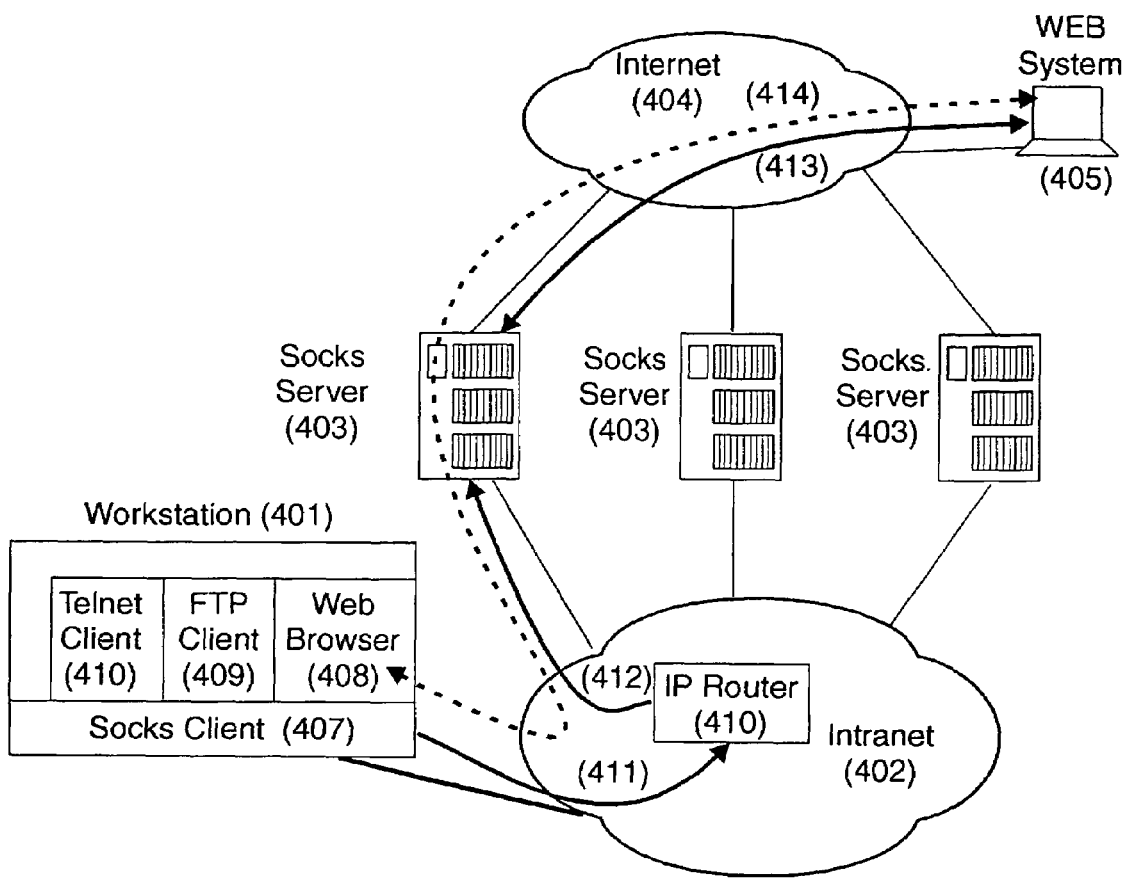
FIG. 4 is a general view of a Socks Client with a plurality of Socks Servers according to prior art.

Socks is a networking proxy protocol that allows client workstations to gain full access to hosts outside their local network while providing a high degree of security. FIG. 4 shows an end user workstation (401) connected to an Intranet (402). The Socks Servers (403) that protect the Intranet attach both the (private) Intranet (402) and the (public) Internet (404). The destination Web System (405) also connects the Internet (the Web System is for instance a WEB Browser, a FTP Server, or any system attached to the Internet that can be accessed from the Intranet).

The end user workstation (401) comprises a software program called Socks Client (407) for a secure access to the World-Wide-Web (WWW) via a Socks Server. The Socks Client creates some form of "virtual tunnel" (called Socks connection) between the workstation and the Socks Server. The Socks protocol is independent of the Application Level protocol, and can therefore be used for instance for HTTP, FTP, or Telnet communications. The Socks connection for transporting Socks data is created by means of a TCP connection established between the Socks Client and the Socks Server.

The IP Router (406) within the Intranet routes each IP Datagram it receives towards its destination, using the Destination IP Address field in the IP Datagram Header.

WEB applications running on an end user workstation (such as a WEB Browser (408), an FTP Client (409), or a Telnet Client (410)) use the services of a Socks Client (407) to gain access to an outside WEB System (405). The Socks Client located on the end user workstation sends (411) each IP Datagram on the Intranet network to a destination Socks Server. IP Routers within the Intranet receive the IP Datagrams and route them (412) towards their destination Socks Server. The Socks Server authenticates the user, authorizes the request, establishes a connection (413) with the outside WEB System, and then transparently forwards application data between the end user workstation and the WEB System (414).

Figure 5:
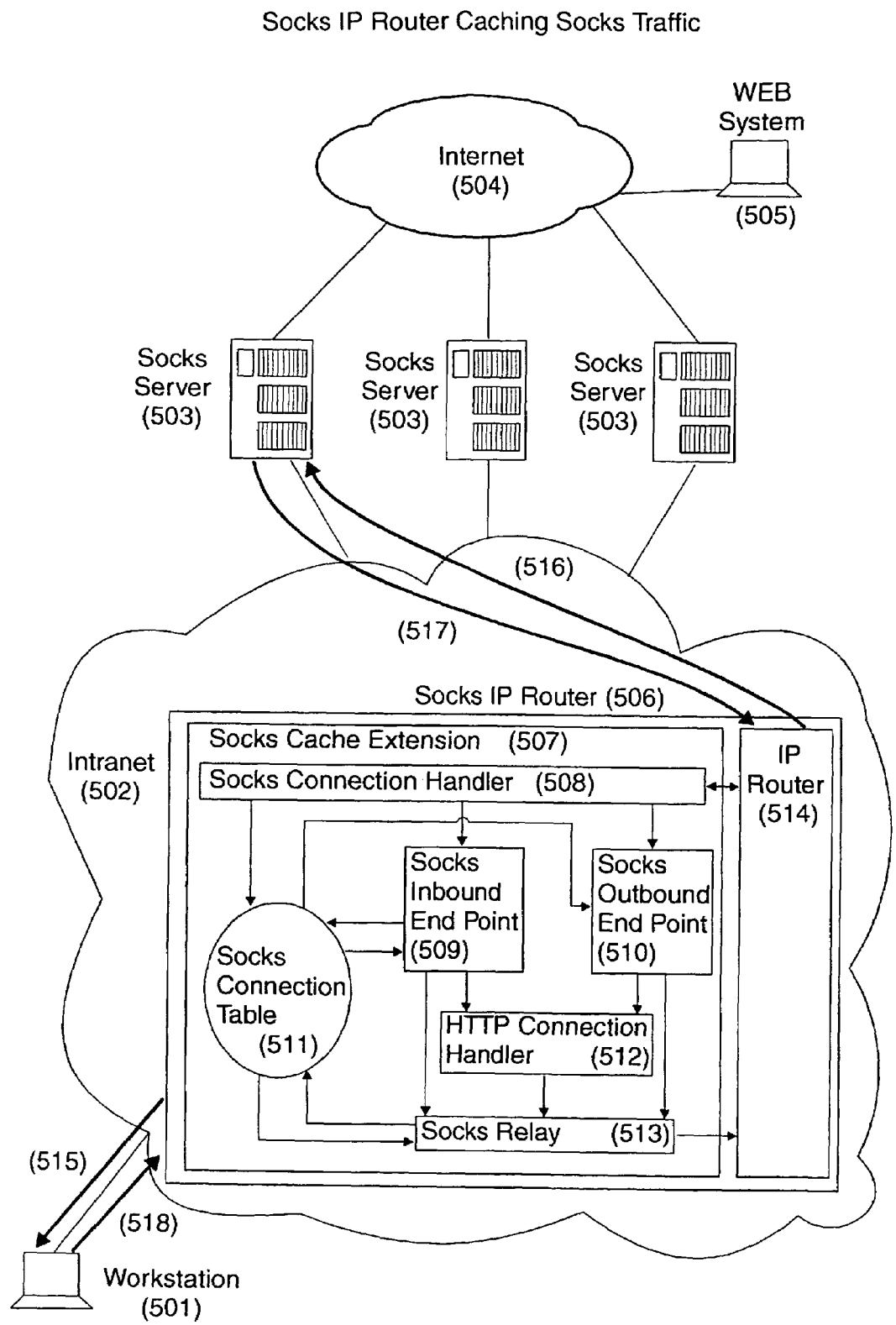
FIG. 5 shows a system for caching HTTP data transported in IP Datagrams with Socks traffic according to the present invention.

The present invention relates to a system and method for caching HTTP data transported with Socks data in IP Datagrams. FIG. 5 is a view of a Socks IP Router according to the present invention.

An end user workstation (501) comprising a Socks Client is connected to the Intranet (502), said Intranet comprising multiple Socks Servers (503) for accessing the WEB System (505) connected to the Internet (504). The IP Router in charge, within the Intranet, of handling the IP Datagrams transporting Socks data, is called "Socks IP Router system" (506). The Socks IP Router system according to the present invention comprises:
an IP Routing component (514) for routing any IP Datagram within the Intranet. This IP Router component can be any existing IP Router.
a Socks Cache Extension component (507).

The Inbound and Outbound traffic are processed differently within the Socks Cache Extention:
Inbound traffic: this is the traffic (515), (518) between the end user workstation (501) and the Socks IP Router (506). A TCP connection between the end user workstation and the Socks IP Router is called "Inbound TCP connection". A TCP connection comprising Socks data between the end user workstation and the Socks IP Router is called "Inbound Socks connection".
Outbound traffic: this is the traffic (516), (517) between the Socks IP Router (506) and a Socks Server (503). A TCP connection between the Socks IP Router and a Socks Server is called "Outbound TCP connection".
A TCP connection comprising Socks data between the Socks IP Router and a Socks Server is called "Outbound Socks connection".

The Socks Cache Extension:
terminates and manages the Inbound and Outbound Socks connections,
caches HTTP data transported in the received IP Datagrams comprising Socks data, and
relays data between Inbound and Outbound Socks connections.

When the Socks IP Router System (506) receives (515) an IP Datagram from an end user workstation (501), or (517) a Socks Server (503), it first forwards this IP Datagram (called incoming IP Datagram) to the Socks Cache Extension (507). Said incoming IP Datagram is then forwarded in sequence to a plurality of other components to perform the method according to the present invention:
(508) A Socks Connection Handler component:
determines if the incoming IP Datagram belongs to either an Inbound Socks connection or an Outbound Socks connection, and
terminates and manages the connection (Inbound or Outbound Socks connection) according to the TCP protocol.
(509) A Socks Inbound End Point component:
terminates and manages the Inbound Socks connection according to the Socks protocol,
analyses the incoming IP Datagram,
builds a Socks Connection table (511) with the characteristics of the Inbound Socks connection, and
determines if said IP Datagram transports HTTP data based on information comprised in the Socks Connection table (511) and in view of the Source IP Address, Source Port, Destination IP Address, and Destination Port fields of said IP Datagram.
(510) A Socks Outbound End Point component:
terminates and manages the Outbound Socks connection according to the Socks protocol, and
determines if the incoming IP Datagram transports HTTP data based on information comprised in the Socks Connection table (511) and in view of the Source IP Address, Source Port, Destination IP Address, and Destination Port fields of said IP Datagram.
(512) An HTTP Connection Handler component comprises an HTTP Caching component for:
terminating and managing the HTTP connection, according to the HTTP protocol,
retrieving HTTP data (for instance a WEB page), called outgoing HTTP data, when the incoming IP Datagram comprises a request to retrieve said HTTP data,
building an HTTP message, called outgoing HTTP message, comprising said outgoing HTTP data,
providing local caching of HTTP data (for instance a WEB page) retrieved from WEB systems, within the Socks IP Router system.
The invention is independent of the HTTP Caching component comprised in the HTTP Connection Handler and does not depends on the way the HTTP data comprised in the incoming IP Datagram is processed and locally cached by this HTTP Caching component.
(513) A Socks Relay component:
updates the Socks Connection table (511) with the characteristics of the Outbound Socks connection associated with the Inbound Socks connection, and
relays data comprised in the incoming IP Datagram between the Inbound Socks connection and the associated Outbound Socks connection. The Socks Relay component builds an outgoing IP Datagram using:
the Socks Connection table (511), the outgoing HTTP message provided by the HTTP Connection Handler, the Source IP Address, Source Port, Destination IP Address, and Destination Port fields of the incoming IP Datagram.

The Socks Cache Extension finally forwards the outgoing IP Datagram built by the Socks Relay component to the IP Router (507) component within the Socks IP Router System. This IP Router component routes the outgoing IP Datagram towards its destination (either (516) a Socks Server or (518) the end user workstation). The invention is independent of the IP Router component and does not rely on the way the IP Datagram is handled and routed by this IP Router component.

The Socks Cache Extension can be enabled or disabled by means for instance of a configuration parameter on said Socks IP Router system. Typically, the Socks Cache Extension:

is enabled on the access Socks IP Router systems at the edge of the Intranet.

is disabled on the Socks IP Router systems located within the Intranet backbone.

Figure 6:
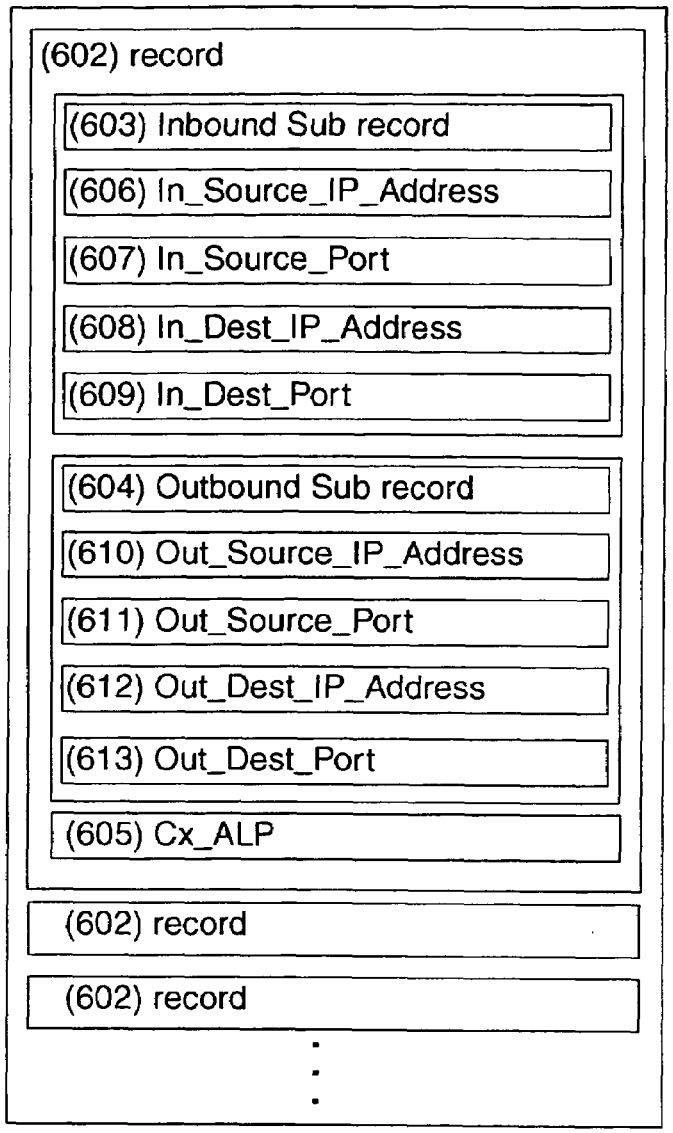
FIG. 6 shows the tables used by the Socks Cache Extension according to the present invention.

FIG. 6 depicts the different tables used by the various components comprised within the Socks Cache Extension for analysing and relaying Socks traffic. The Socks Cache Extension dynamically builds and uses one internal table, for internal purpose:

(601) Socks Connection table. This table comprises for each Inbound Socks connection the identifier of the Outbound Socks connection and the Application Level protocol. This internal table is detailed in FIG. 6.

The Socks Connection table (601) is an internal table built by the Socks Inbound End Point component and by the Socks Relay component. This table is used by all components of the Socks Cache Extension to store for each Inbound Socks connection, the identifier of the Outbound Socks connection and the Application Level protocol. The table contains a list of records (602), each record comprising the following information:

(603) Inbound subrecord. This subrecord (one per record (602)) identifies the Inbound Socks connection (the connection between the end user workstation and the Socks IP Router system) and comprises the following information:

(606) In_Source_IP_Address. This is the IP address of the system which is the originator of the Inbound Socks connection (this system is called "originator" or "origin device"). Typically, this is the address of an end user workstation.

(607) In_Source_Port. This is the number of the Port identifying the program (the application) running on the origin device and which is the originator of the Inbound Socks connection.

(608) In_Dest_IP_Address. This is the IP address of the system which is the destination of the Inbound Socks connection (this system is called "destination" or "destination device"). Typically, this is the address of a Socks Server. This is not the address of the Socks IP Router system since the end user workstation establishes connections with Socks servers and not with the Socks IP Router system (the Socks IP Router system is transparent to the end user workstation which only knows the Socks servers).

(609) In_Dest_Port. This is the number of the Port identifying the program (the application) running on the destination device and which is the destination of the Inbound Socks connection.

The combination of In_Source_IP_Address, In_Source_Port, In_Dest_IP_Address, and In_Dest_Port identifies in a unique way the Inbound Socks connection.

(604) Outbound subrecord. This subrecord (one per record (602)) identifies the Outbound Socks connection (the connection between the Sock IP Router system and a Socks Server) which is associated with the Inbound Socks connection (603). The Outbound subrecord comprises the following information:

(610) Out_Source_IP_Address. This is the IP address of the system which is the originator of the Outbound Socks connection (this system is called "originator" or "origin device"). Typically, this is the address of the Socks IP Router system.

(611) Out_Source_Port. This is the number of the Port identifying the program (the application) running on the origin device and which is the originator of the Outbound Socks connection.

(612) Out_Dest_IP_Address. This is the IP address of the system which is the destination of the Outbound Socks connection (this system is called "destination" or "destination device"). Typically, this is the address of a Socks Server.

(613) Out_Dest_Port. This is the number of the Port identifying the program (the application) running on the destination device and which is the destination of the Outbound Socks connection.

The combination of Out_Source_IP_Address, Out_Source_Port, Out_Dest_IP_Address, and Out_Dest_Port identifies in a unique way the Outbound Socks connection.

(605) Cx_ALP. This is the Application Level protocol (such as HTTP, FTP, Telnet) used by Socks data transported in the IP Datagrams of the Inbound Socks connection (603). Since the same ALP is used between the end user workstation and the Socks IP Router system (Inbound Socks connection), and between the Socks IP Router system and the Socks Server (Outbound Socks connection), Cx_ALP is also the Application Level protocol used by Socks data transported in the IP Datagrams of the Outbound Socks connection associated with the Inbound Socks connection.

The Socks Connection Handler component of the Socks Cache Extension is preferably a computer program running on the Socks IP Router System. This component is in charge of:

determining if the incoming IP Datagram belongs to an Inbound Socks connection or to an Outbound Socks connection, and terminating and managing said Inbound or Outbound Socks connection according to the TCP protocol.

Figure 7:
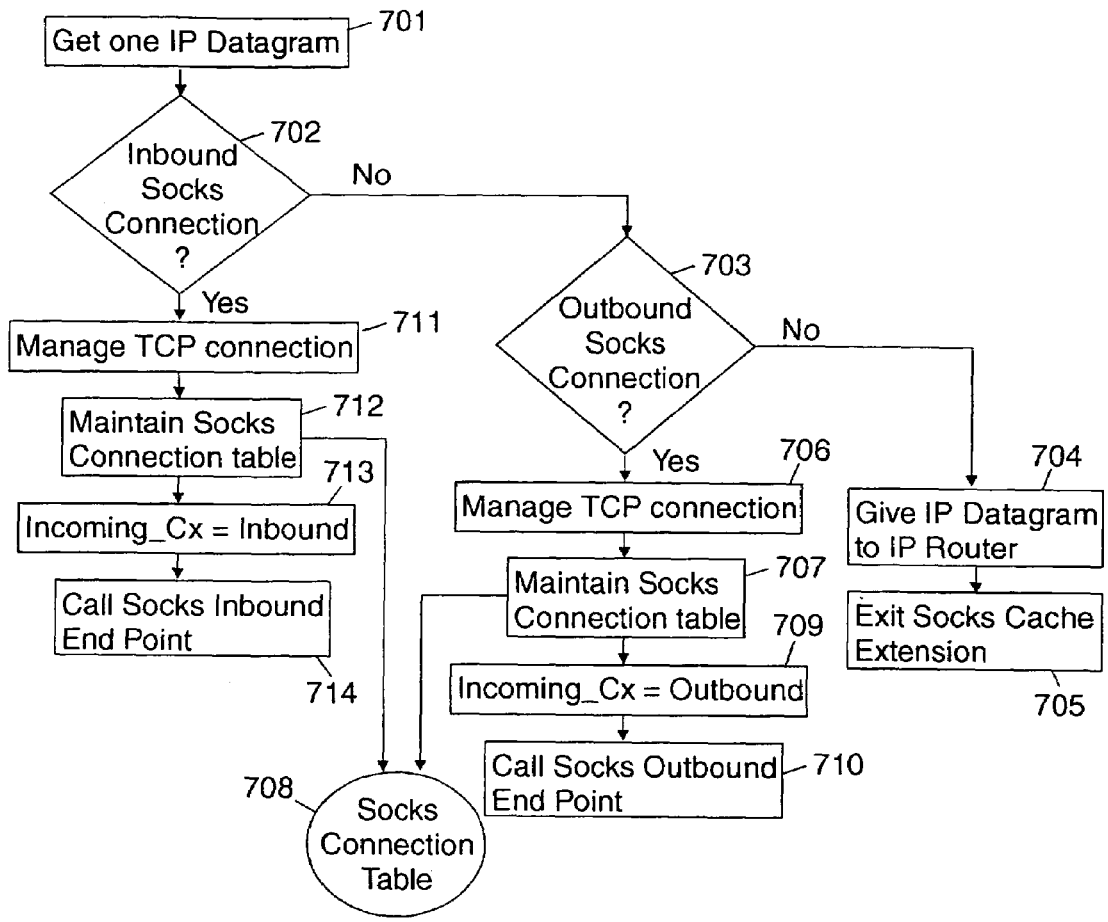
FIG. 7 is a flow chart of the Socks Connection Handler component within the Socks IP Router system according to the present invention.

FIG. 7 is a flow chart which refers to the internal logic of the Socks Connection Handler component. This component:

(701) retrieves an IP Datagram (the incoming IP Datagram).

(702) tests whether the IP Datagram belongs to an Inbound Socks connection or not. The test preferably uses the Destination Port field of the TCP Header comprised in the Data part of the IP Datagram. The Destination Port is compared to the Port that uses the Socks protocol (by default, the Port used by Socks is 1080). For instance, the Port used by the Socks protocol can be a configuration parameter of the Socks Cache Extension. If the Destination Port in the TCP Header is equal to the Port used by Socks, then the IP Datagram transports Socks traffic towards a Socks Server. The IP Datagram is therefore originated by an end user workstation, and as such belongs to an Inbound Socks connection.

If the IP Datagram belongs to an Inbound Socks connection:
- (711) terminates and manages the TCP connection originated by the end user workstation, according to the TCP protocol. The Socks Connection Handler acts as a TCP destination end point for this Inbound Socks connection.
- (712) removes from the Socks Connection table (708) records of closed Socks connections. Closed Socks connections are detected for instance using the FIN and ACK indications in the TCP Header. Optionally, a Socks connection is considered closed after a certain period of time without IP Datagram on that Socks connection (this timer value can be for instance a configuration parameter of the Socks Cache Extension). Any other existing algorithm to detect closed or half closed (for instance when one extremity of the connection has abnormally terminated) TCP connections can also be used to remove such connections from the table.
- (713) stores an information indicating that the IP Datagram belongs to an Inbound Socks connection: Incoming_Cx=Inbound
- (714) calls the Socks Inbound End Point component.

If the IP Datagram is not comprised in an Inbound Socks connection:
- (703) tests whether the IP Datagram belongs to an Outbound Socks connection or not. The test preferably uses the Source Port field of the TCP Header comprised in the Data part of the IP Datagram. The Source Port is compared to the Port that uses the Socks protocol (by default, the Port used by Socks is 1080). For instance, the Port used by the Socks protocol can be a configuration parameter of the Socks Cache Extension. If the Source Port in the TCP Header is equal to the Port used by Socks, then the IP Datagram transports Socks traffic from a Socks Server. The IP Datagram is therefore originated by a Socks Server, and as such belongs to an Outbound Socks connection.

If the IP Datagram belongs to an Outbound Socks connection:
- (706) terminates and manages the TCP connection originated by the Socks Server, according to the TCP protocol. The Socks Connection Handler acts as the TCP destination end point for the Outbound Socks connection.
- (707) removes from the Socks Connection table (708) records of closed Socks connections. Closed Socks connections are detected for instance using the FIN and ACK indications in the TCP Header. Optionally, a Socks connection is considered closed after a certain period of time without IP Datagram on that Socks connection (this timer value can be for instance a configuration parameter of the Socks Cache Extension). Any other existing algorithm to detect closed or half closed (for instance when one extremity of the connection has abnormally terminated) TCP connections can also be used to remove such connections from the table.
- (709) stores an information indicating that the IP Datagram belongs to an Outbound Socks connection: Incoming_Cx=Outbound
- (710) calls the Socks Inbound End Point component, If the IP Datagram is not comprised in an Outbound Socks connection:

The IP Datagram is therefore not comprised in a Socks connection (neither Inbound nor Outbound):
- (704) The Socks Cache Extension is not involved in the processing of non Socks traffic. The IP Datagram is directly forwarded to the IP Router component of the Socks IP Router System.
- (705) the processing by the Socks Cache Extension of the IP Datagram is completed. The Socks Cache Extension waits for the next IP Datagram.

The Socks Inbound End Point component of the Socks Cache Extension is preferably a computer program running on the Socks IP Router System. This component is in charge of:
- terminating and managing the Inbound Socks connection according to the Socks protocol,
- building the Socks Connection table (601) with the characteristics of the Inbound Socks connection,
- determining if the received IP Datagram comprises HTTP data, based on the information comprised in the Socks Connection table (601) and in view of the Source IP Address, Source Port, Destination IP Address, and Destination Port fields of said IP Datagram.

Figure 8:
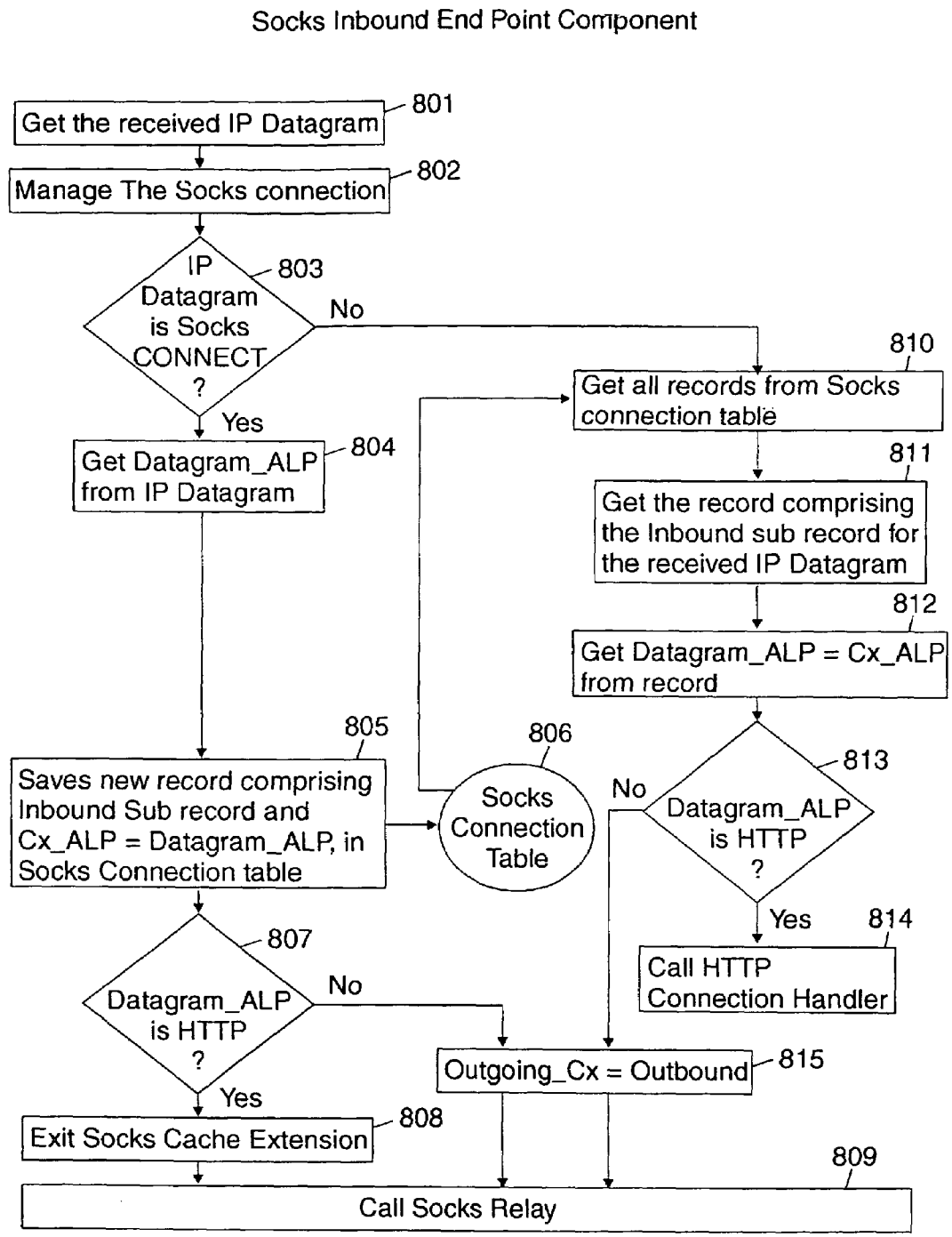
FIG. 8 is a flow chart of the Socks Inbound End Point component within the Socks IP Router system according to the present invention.

FIG. 8 is a flow chart which refers to the internal logic of the Socks Inbound End Point component. This component:
- (801) retrieves an IP Datagram (the incoming IP Datagram).
- (802) terminates and manages the Socks connection originated by the end user workstation, according to the Socks protocol. The Socks Inbound End Point acts as the destination end point for the Inbound Socks connection
- (803) checks if the IP Datagram is a Socks CONNECT message. A Socks CONNECT message is identified by the CD field in the Application Level message (CD=1).

If the IP Datagram is a Socks CONNECT message:
The IP Datagram therefore belongs to a new Inbound Socks connection.
- (804) determines from the IP Datagram (in the Destport field of the Socks CONNECT message), the Application Level protocol (ALP) transported by the Socks connection:
  Datagram_ALP=Destport field (in Socks CONNECT message)
- (805) Saves in a new record within the Socks Connection table (806) the information related to the Inbound Socks connection. The Inbound Socks connection is uniquely identified by the information comprised in the IP Header and TCP Header about the originator and the destination of the IP Datagram:
  In_Source_IP_Address=Source IP Address field (in IP Header)
  In_Source Port=Source Port field (in TCP Header)
  In_Dest IP_Address=Destination IP address field (in IP Header)
  In_Dest_Port=Destination Port field (in TCP Header)
  Cx_ALP=Datagram_ALP
- (807) tests whether the IP Datagram transports HTTP traffic or not. The test uses the Datagram_ALP. The Datagram_ALP is compared to the Port that uses the HTTP protocol (by default, the Port used by HTTP is 80) For instance, the Port used by the HTTP protocol can be a configuration parameter of the Socks Cache Extension. If Datagram_ALP=HTTP, the IP Datagrams transports HTTP traffic.

If the IP Datagram transports HTTP traffic:
  (808) the processing of the IP Datagram by the Socks Cache Extension is completed. The Socks Cache Extension waits for the next IP Datagram.

If the IP Datagram does not transport HTTP traffic:
No HTTP processing is involved within the Socks Cache Extension. The data comprised within the incoming IP Datagram is relayed to its destination. Since the incoming IP Datagram belongs to an Inbound Socks connection, data comprised within said incoming IP Datagram is relayed within an outgoing IP Datagram belonging to an Outbound Socks connection.
  (815) stores information indicating that the outgoing IP Datagram has to be sent on an Outbound Socks connection:
    Outgoing_Cx=Outbound
  (809) calls Socks Relay.

If the IP Datagram is a not a Socks CONNECT message:
The IP Datagram therefore belongs to an Inbound Socks connection which is already established. This means that a CONNECT message has already been received and the corresponding record has been created in the Socks Connection table.
  (810) retrieves all records from the Socks Connection table (806).
  (811) finds the record which corresponds to the Inbound Socks connection which the IP Datagram belongs to. This record is identified by (four conditions):
    In_Source_IP_Address=Source IP Address field (in IP Header)
    In_Source_Port=Source Port field (in TCP Header)
    In_Dest_IP_Address=Destination IP address field (in IP Header)
    In_Dest_Port=Destination Port field (in TCP Header)
  (812) retrieves the ALP of the Inbound Socks connection, from that record. This is the Application Level protocol used by the Socks data comprised in the IP Datagram:
    Datagram_ALP=Cx_ALP
  (813) tests whether the IP Datagram transports HTTP traffic or not. The test uses the Datagram_ALP, which is compared to the Port that uses the HTTP protocol (by default, the Port used by HTTP is 80). For instance, the Port used by the HTTP protocol can be a configuration parameter of the Socks Cache Extension.
  If Datagram_ALP=HTTP, the IP Datagrams transports HTTP traffic.
    If the IP Datagram transports HTTP traffic:
      (814) calls HTTP Connection Handler.
    If the IP Datagram does not transport HTTP traffic:
    No HTTP processing is involved within the Socks Cache Extension. The data comprised within the incoming IP Datagram is relayed to its destination. Since the incoming IP Datagram belongs to an Inbound Socks connection, the data comprised within said IP Datagram is relayed within an outgoing IP Datagram belonging to an Outbound Socks connection.
      (815) stores an information indicating that the outgoing IP Datagram has to be sent on an Outbound Socks connection:
        Outgoing_Cx=Outbound
      (809) calls Socks Relay.

The Socks Outbound End Point component of the Socks Cache Extension is preferably a computer program running on the Socks IP Router System. This component is in charge of:
  terminating and managing the Outbound Socks connection according to the Socks protocol,
  determining if the received IP Datagram transports HTTP data, based on the information comprised in the Socks Connection table (601) and in view of the Source IP Address, Source Port, Destination IP Address, and Destination Port fields of said IP Datagram.

Figure 9:
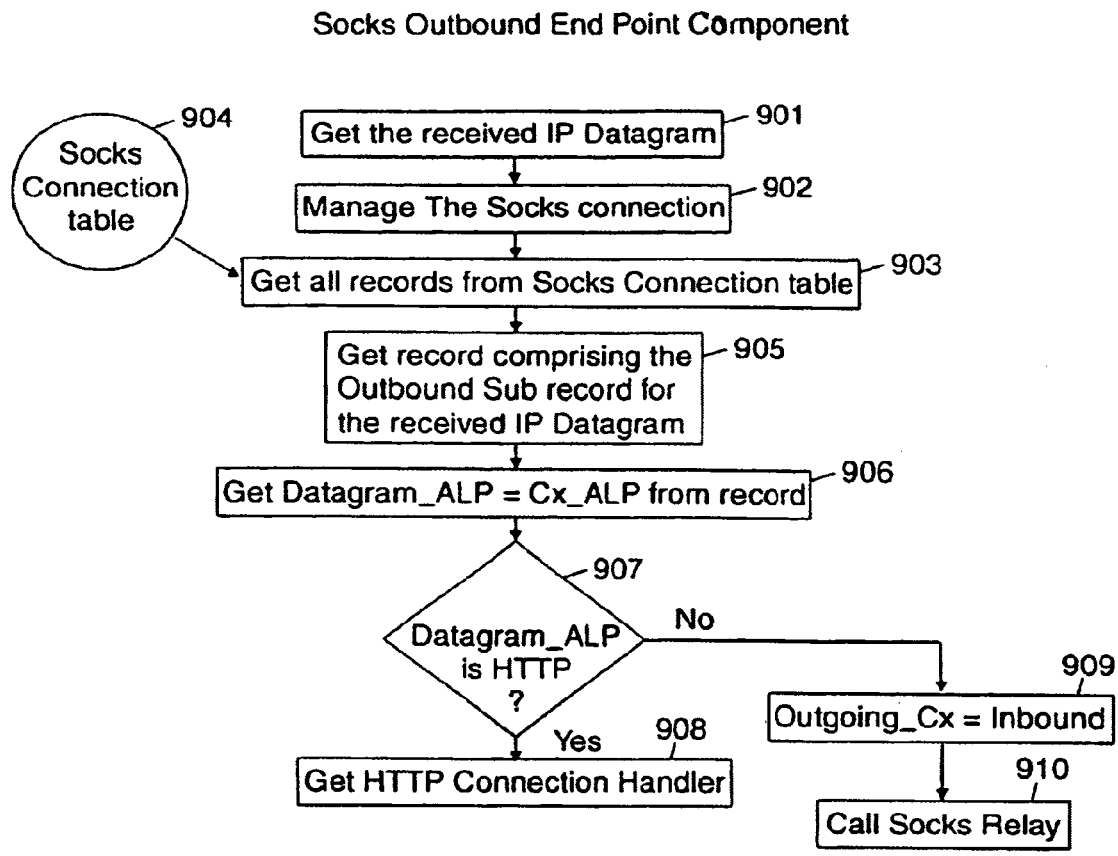
FIG. 9 is a flow chart of the Socks Outbound End Point component within the Socks IP Router system according to the present invention.

FIG. 9 is a flow chart which refers to the internal logic of the Socks Outbound End Point component. This component:
  (901) retrieves an IP Datagram (the incoming IP Datagram). The IP Datagram belongs to an Outbound Socks connection. Since a Socks connection is always initiated by an end user workstation on an Inbound Socks connection, a CONNECT message has already been received on the Inbound Socks connection associated to this Outbound Socks connection. The associated connection record (602) has therefore already been created in the Socks Connection table (601).
  (902) terminates and manages the Socks connection originated by the Socks Server according to the Socks protocol. The Socks Outbound End point component acts as the destination end point for the Outbound Socks connection.
  (903) retrieves all records from the Socks Connection table (904).
  (905) finds the record which corresponds to the Outbound Socks connection. Since the Outbound subrecord is created by the Socks Relay component with source and destination information retrieved from an outgoing IP Datagram, said source and destination information have to be swapped for processing an incoming IP Datagram. For instance, the Socks server which is the destination of an outgoing IP Datagram, is the source of an incoming IP Datagram. The record is then identified by (four conditions):
    Out_Source_IP_Address=Destination IP Address field (in IP Header)
    Out_Source_Port=Destination Port field (in TCP Header)
    Out_Dest_IP_Address=Source IP address field (in IP Header)
    Out_Dest_Port=Source Port field (in TCP Header)
  (906) retrieves the ALP of the Outbound Socks connection, from that record. This is the Application Level protocol used by the Socks data comprised in the IP Datagram:
    Datagram_ALP=Cx_ALP
  (907) tests whether the IP Datagram transports HTTP traffic or not. The test uses the Datagram_ALP, which is compared to the Port that uses the HTTP protocol (by default, the Port used by HTTP is 80). For instance, the Port used by the HTTP protocol can be a configuration parameter of the Socks Cache Extension. If Datagram_ALP_HTTP, then the IP Datagrams transports HTTP traffic.

If the IP Datagram does not transport HTTP traffic:
No HTTP processing is involved within the Socks Cache Extension. The data comprised within the incoming IP Datagram is relayed to its destination. Since the incoming IP Datagram belongs to an Outbound Socks connection, the data comprised within said IP Datagram is relayed within an outgoing IP Datagram belonging to an Inbound Socks connection.
  (909) stores an information indicating that the outgoing IP Datagram has to be sent on an Inbound Socks connection:
    Outgoing_Cx=Inbound
  (910) calls Socks Relay.
If the IP Datagram does transport HTTP traffic:
  (908) calls the HTTP Connection Handler.

The HTTP Connection Handler component of the Socks Cache Extension is preferably a computer program running on the Socks IP Router System. This component is in charge of:
  terminating and managing the HTTP connection, according to the HTTP protocol,
  retrieving HTTP data (for instance a WEB page), called outgoing HTTP data, when the incoming IP Datagram comprises a request to retrieve said HTTP data,
  building one HTTP message, called outgoing HTTP message, comprising said outgoing HTTP data,
  providing local caching of HTTP data (for instance a WEB page) retrieved from WEB systems, within the Socks IP Router system.

The HTTP Connection Handler comprises an HTTP Caching component. The invention is independent of this HTTP Caching component, which can be any existing HTTP Proxy software providing HTTP Caching function. It does not rely on the way the HTTP data comprised in the incoming IP Datagram is processed and locally cached by this HTTP Caching component.

Figure 10:
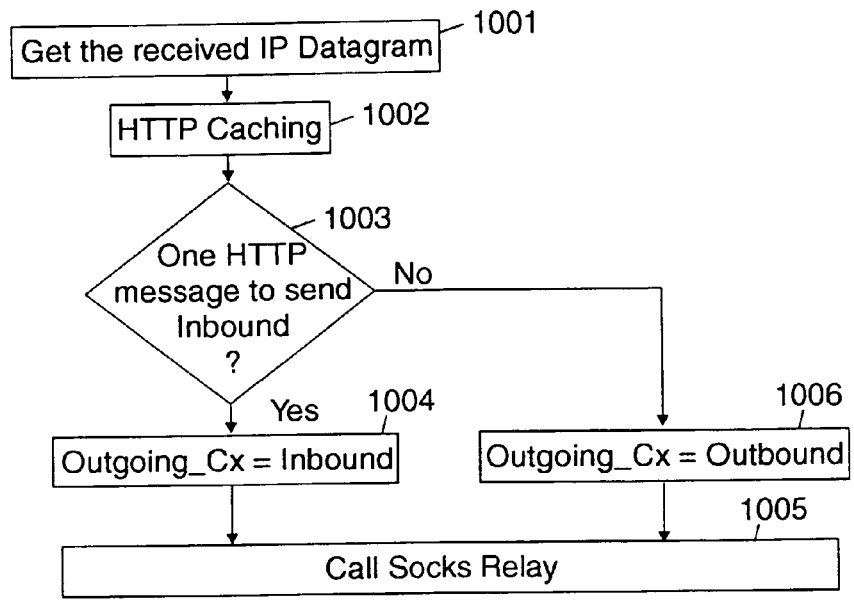
FIG. 10 is a flow chart of the HTTP Connection Handler component within the Socks IP Router system according to the present invention.

FIG. 10 is a flow chart which refers to the internal logic of the HTTP Connection Handler component. This component:
  (1001) retrieves one IP Datagram (that is an incoming IP Datagram) forwarded by either the Socks Inbound End Point component or by the Socks Outbound End Point component.
  (1002) performs HTTP Caching. This function is provided by an HTTP Caching component comprised in the HTTP Connection Handler. The invention is independent of this HTTP Caching component, which can be any existing HTTP Proxy software providing HTTP Caching function. Basically, the HTTP Caching component provides the functions of any existing HTTP Proxy providing HTTP Caching, that is:
    terminating and managing the HTTP connection, according to the HTTP protocol,
    retrieving HTTP data (for instance a WEB page), called outgoing HTTP data, when the incoming IP Datagram comprises a request to retrieve said HTTP data,
    building one HTTP message, called outgoing HTTP message, comprising said outgoing HTTP data,
    providing local caching of HTTP data (for instance a WEB page) retrieved from WEB systems, within the Socks IP Router system.
  Said outgoing HTTP message is either:
    an HTTP message that has to be sent on an Inbound Socks connection to an end user workstation. This is for instance an HTTP message comprising a WEB page that has to be sent to an end user workstation. This outgoing HTTP message is the response to a request (a GET command) previously received from the end user workstation to retrieve said WEB page. Said WEB page has been retrieved by the HTTP Caching component either from:
      the local cache, when the requested WEB page is located within the local cache, or
      the destination WEB system indicated in the request, when the WEB page is not located within the local cache.
    a HTTP message that has to be sent on an Outbound Socks connection to a Socks Server. This is for instance a request (a GET command) that has to be sent to a Socks Server to retrieve a WEB page located on a destination WEB system.
  The HTTP Caching component returns to the HTTP Connection Handler component:
    said outgoing HTTP message comprising the outgoing HTTP data (for instance a WEB page).
    an indication of the direction (either Inbound or Outbound) of said outgoing HTTP message. The HTTP message is sent within an IP Datagram (called outgoing IP Datagram) either on an Inbound Socks connection (towards an end user workstation), or on an Outbound Socks connection (towards a Socks Server).
  (1003) tests whether the direction of the outgoing HTTP message returned by the HTTP Caching component is Inbound or not. This indication is sent by the HTTP Caching component along with the outgoing HTTP message.
  If the direction of the outgoing HTTP message is Inbound:
    (1004) stores an information indicating that the outgoing IP Datagram comprising the outgoing HTTP message has to be sent on an Inbound Socks connection:
      Outgoing_Cx=Inbound
    (1005) calls Socks Relay
  If the direction of the outgoing HTTP message is not Inbound:
  The direction of the outgoing HTTP message is then Outbound
    (1006) stores an information indicating that the outgoing IP Datagram comprising the outgoing HTTP message has to be sent on an Outbound Socks connection:
      Outgoing_Cx=Outbound
    (1005) calls Socks Relay Socks Relay
  The Socks Relay component of the Socks Cache Extension is preferably a computer program running on the Socks IP Router System. The Socks Relay component is in charge of:
    updating the Socks Connection table (511) with the characteristics of the Outbound Socks connections,
    relaying data between Inbound and Outbound Socks connections,
    building a outgoing IP Datagram using:
      the Socks Connection table (511),
      the outgoing HTTP message provided by the HTTP Connection Handler,
      the Source IP Address, Source Port, Destination IP Address, and Destination Port fields of the incoming IP Datagram.

Figure 11:
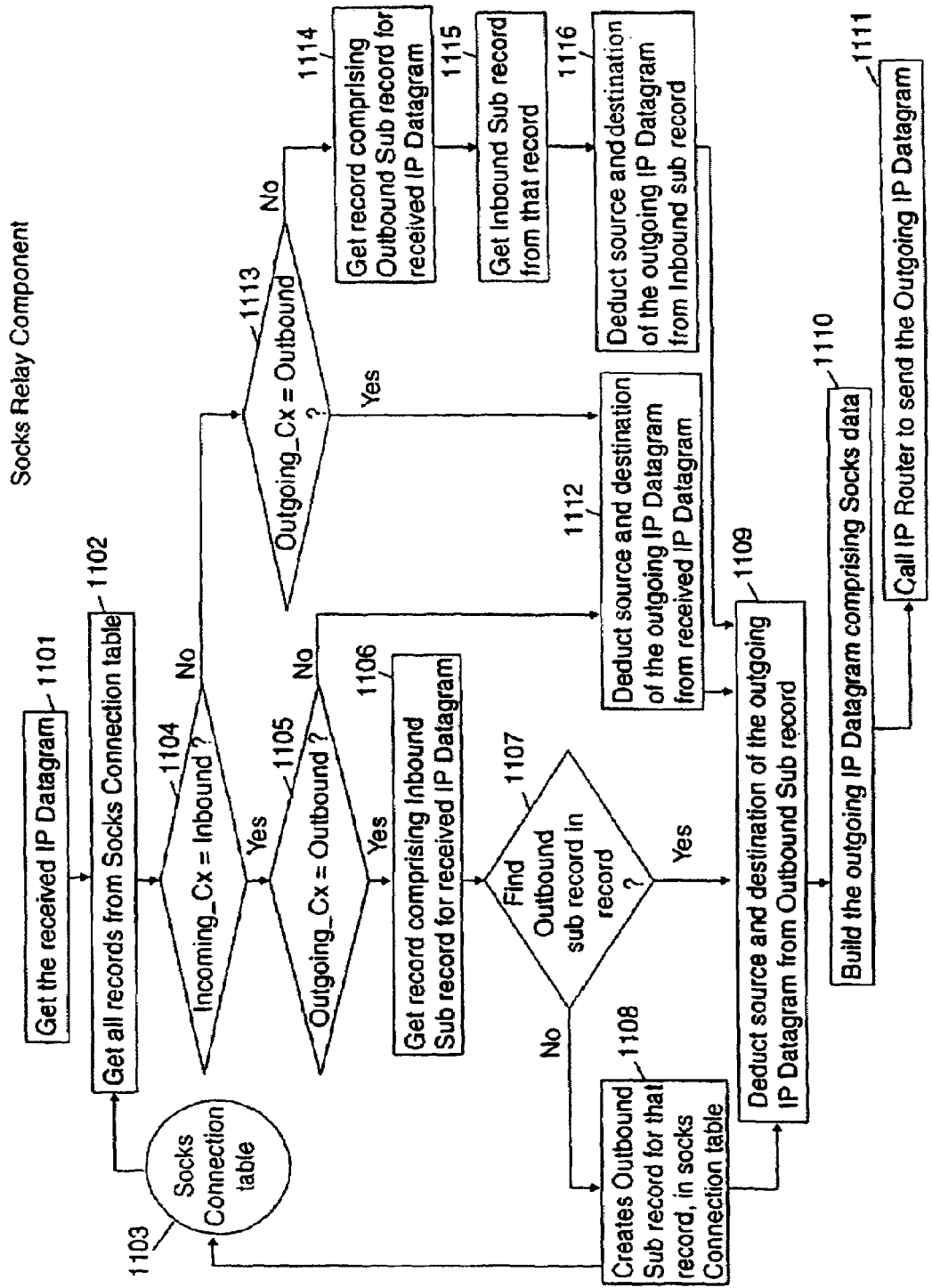
FIG. 11 is a flow chart of the Socks TOS Builder component within the Socks IP Router system according to the present invention.

FIG. 11 is a flow chart which refers to the internal logic of the Socks Relay component. This component:

(1101) retrieves:
- the IP Datagram (the incoming IP Datagram),
- the indication (Incoming_Cx) of the direction of the Socks connection the incoming IP Datagram belongs to. Said indication is provided by the Socks Connection Handler component.
- the indication (Outgoing_Cx) of the direction of the Socks connection the outgoing IP Datagram belongs to. Said indication is provided by the Socks Inbound End Point, the Sock Outbound End Point, or the HTTP Connection Handler.
- If any, the outgoing HTTP message passed by the HTTP Connection Handler.

(1102) retrieves all records from the Socks Connection table (1103).

(1104) tests if the incoming IP Datagram belongs to an Inbound Socks connection. The test uses the Incoming_Cx indication:

If Incoming_Cx=Inbound, then the incoming IP Datagram belongs to an Inbound Socks connection.

If the incoming IP Datagram belongs to an Inbound Socks connection

The incoming IP Datagram is therefore originated from an end user workstation.

(1105) tests if the outgoing IP Datagram must be sent on an Outbound Socks connection. The test is done using the Outgoing_Cx indication.

If Outgoing_Cx=Outbound, then the outgoing IP Datagram must be sent on an Outbound Socks connection.

If the outgoing IP Datagram belongs to an Outbound Socks connection

The outgoing IP Datagram has therefore to be sent to a Socks Server, while the incoming IP Datagram is originated from an end user workstation.

(1106) finds the record (called "record_R") within the Socks Connection table, which corresponds to the Inbound Socks connection the incoming IP Datagram belongs to.

This record is identified by (four conditions):
In_Source IP_Address=Source IP Address field (in IP Header)
In_Source_Port=Source Port field (in TCP Header)
In_Dest_IP_Address=Destination IP address field (in IP Header)
In_Dest_Port=Destination Port field (in TCP Header)

(1107) tests if "record_R" comprises an Outbound subrecord.

If "record_R" does not comprise (yet) an Outbound subrecord:

(1108) creates an Outbound subrecord within said record, in the Socks Connection table (1103). Since the Outbound Socks connection relays the Inbound Socks connection towards its destination (a Socks Server), the destination of the Outbound Socks connection must be the same as the destination of the Inbound Socks connection (said Socks server):
Out_Dest_IP_Address=In_Dest_IP_Address
Out_Dest_Port=In_Dest_Port
Since the Socks Cache Extension within the Socks IP Router system terminates the Inbound Socks connection, the originator of the Outbound Socks connection is not the originator of the Inbound Socks connection but is the Socks IP Router system. As for any TCP/IP connection originated from a TCP/IP device, the source information for the Outbound Socks connection is retrieved from the TCP/IP stack comprised in the Socks IP Router system.
Out_Source_IP_Address=Source IP Address (from TCP/IP stack)
Out_Source Port=Source Port field (from TCP/IP stack)

The "record_R" comprises an Outbound subrecord (either newly created in (1108), or previously created when at receipt of a previous IP Datagram).

(1109) deducts the source and destination information for the outgoing IP Datagram, from the Outbound subrecord comprised in the "record_R" record:
DT_Source_IP_Address=Out_Source_IP_Address
DT_Source_Port=Out_Source_Port
DT_Dest_IP_Address=Out_Dest_IP_Address
DT_Dest Port=Out_Dest Port (1110) builds the outgoing IP Datagram comprising Socks data, according to the IP, TCP and Socks protocols, using:
DT_Source_IP_Address and DT_Dest_IP_Address which are the values of Source IP address (310) and Destination IP address (311) fields in the IP Header.
DT_Source_Port and DT_Dest_Port which are the values of Source Port (312) and Destination Port (313) fields in the TCP Header.
The HTTP message, provided by the HTTP Connection Handler encapsulated with socks data in the Application Level data field (309).
The socks data comprised in the incoming IP Datagram which needs to be relayed (for instance the TCP data (306)).

(1111) calls the IP Router component to send the outgoing IP Datagram to its destination.

The Socks Cache Extension then exits and waits for the next incoming IP Datagram.

If the outgoing IP Datagram does not belong to an Outbound Socks connection (it then belongs to an Inbound Socks connection).

The outgoing IP Datagram has therefore to be sent to an end user workstation. Because the incoming IP Datagram is originated from an end user workstation, the outgoing IP Datagram is a response to this incoming IP Datagram.

(1112) deducts the source and destination information for the outgoing IP Datagram, from the IP Header and TCP Header of the incoming IP Datagram:
DT_Source_IP_Address=Destination IP Address (IP Header)
DT_Source_Port=Destination Port (TCP Header)
DT_Dest_IP_Address=Source IP Address (IP Header)
DT_Dest_Port=Source Port (TCP Header)

(1110) builds the outgoing IP Datagram comprising Socks data, according to the IP, TCP and Socks protocols, using:

DT_Source_IP_Address and DT_Dest_IP_Address which are the values of Source IP address (310) and Destination IP address (311) fields in the IP Header.

DT_Source_Port and DT_Dest_Port which are the values of Source Port (312) and Destination Port (313) fields in the TCP Header.

The HTTP message, provided by the HTTP Connection Handler encapsulated with socks data in the Application Level data field (309).

The socks data comprised in the incoming IP Datagram which needs to be relayed (for instance the TCP data (306)).

(1111) calls the IP Router component to send the outgoing IP Datagram to its destination. The Socks Cache Extension then exits and waits for the next incoming IP Datagram.

If the incoming IP Datagram does not belong to an Inbound Socks connection (it then belongs to an Outbound connection).

The incoming IP Datagram is therefore originated from a Socks Server.

(1113) tests if the outgoing IP Datagram must be sent on an Outbound Socks connection. The test is done using the Outgoing_Cx indication.

If Outgoing_Cx=Outbound, then the outgoing IP Datagram must be sent on an Outbound Socks connection.

If the outgoing IP Datagram does not belong to an Outbound Socks connection (it then belongs to an Inbound Socks connection).

The outgoing IP Datagram has therefore to be sent to an end user workstation, while the incoming IP Datagram is originated from a Socks Server.

(1114) finds the record (called "record_R") within the Socks Connection table, which corresponds to the Outbound Socks connection the incoming IP Datagram belongs to. Since the Outbound subrecord is created by the Socks Relay component with source and destination information retrieved from an outgoing IP Datagram, said source and destination information have to be swapped for processing an incoming IP Datagram. For instance, the Socks server which is the destination of an outgoing IP Datagram, is the source of an incoming IP Datagram. This record is then identified by (four conditions):

Out_Source_IP_Address=Destination IP Address field (in IP Header)

Out_Source_Port=Destination Port field (in TCP Header)

Out_Dest_IP_Address=Source IP address field (in IP Header)

Out_Dest_Port=Source Port field (in TCP Header)

(1115) gets the Inbound subrecord from "record_R".

(1116) deducts the source and destination information for the outgoing IP Datagram, from the Inbound subrecord comprised in the "record_R" record. Since the Inbound subrecord is created with the source and destination information retrieved from an incoming IP Datagram, said source and destination information have to be swapped for processing an outgoing IP Datagram. For instance, the end user workstation which is the source of an incoming IP Datagram, is the destination of an outgoing IP Datagram.

DT_Source IP_Address=In Destination IP_Address

DT_Source Port=In Destination Port

DT_Dest IP_Address=In_Source IP_Address

DT_Dest Port=In_Source Port (1110) builds the outgoing IP Datagram comprising Socks data, according to the IP, TCP and Socks protocols, and using:

DT_Source_IP_Address and DT_Dest_IP_Address, as the values for Source IP address (310) and Destination IP address (311) fields in the IP Header.

DT_Source_Port and DT_Dest_Port, as the values for Source Port (312) and Destination Port (313)—fields in the TCP Header.

The HTTP message, provided by the HTTP Connection Handler encapsulated with socks data in the Application Level data field (309).

The socks data comprised in the incoming IP Datagram which needs to be relayed (for instance the TCP data (306)).

(1111) calls the IP Router component to send the outgoing IP Datagram to its destination.

The Socks Cache Extension then exits and waits for the next incoming IP Datagram.

If the outgoing IP Datagram belongs to an Outbound Socks connection.

The outgoing IP Datagram has therefore to be sent to a Socks Server. Because the incoming IP Datagram is originated from a Socks Server, the outgoing IP Datagram is therefore a response to this incoming IP Datagram.

(1112) deducts the source and destination information for the outgoing IP Datagram, from the IP Header and TCP Header of the incoming IP Datagram:

DT_Source_IP_Address=Destination IP Address (IP Header)

DT_Source_Port=Destination Port (TCP Header)

DT_Dest_IP_Address=Source IP Address (IP Header)

DT_Dest_Port=Source Port (TCP Header)

(1110) builds the outgoing IP Datagram comprising Socks data, according to the IP, TCP and Socks protocols, using:

DT_Source_IP_Address and DT_Dest_IP_Address which are the values of Source IP address (310) and Destination IP address (311) fields in the IP Header.

DT_Source_Port and DT_Dest_Port which are the values of Source Port (312) and Destination Port (313) fields in the TCP Header.

The HTTP message, provided by the HTTP Connection Handler encapsulated with socks data in the Application Level data field (309).

The socks data comprised in the incoming IP Datagram which needs to be relayed (for instance the TCP data (306)).

(1111) calls the IP Router component to send the outgoing IP Datagram to its destination. The Socks Cache Extension then exits and waits for the next incoming IP Datagram.

Using the present invention:
- The response time of the HTTP service is improved, because the requests to retrieve HTTP data (for instance a WEB page) already located within the cache within the Socks IP Router system, are immediately fulfilled by the Socks IP Router system.
- The utilization of the network resources is reduced, because no traffic is needed between the Socks IP Router system and destination WEB systems when requested HTTP data (for instance a WEB page) are already located within the cache.
- The HTTP Caching is provided in a Socks environment, when end user workstations access WEB systems outside the Intranet through Socks servers (and not through HTTP Proxy servers).
- The configuration of the end user workstations within the Intranet is very simple. End user workstations only need to be configured to access Socks servers. End user workstations do not need to be configured to access HTTP Proxy servers for some particular protocols (for instance HTTP and FTP) and Socks servers for other particular protocols (for instance Telnet).
- The HTTP Caching is provided within the Intranet backbone by the Socks IP Routers system. The response time and the utilization of network resources are therefore optimized, because the HTTP caching is done close to the end user workstations. For instance, the network path to retrieve a WEB page is shorter (and provides a better response time) than when the HTTP Caching is provided on the Socks Servers.
- There is no impact nor dependency on the end user workstation. The Socks IP Router system is transparent for the end user workstations. No specific software is required on end user workstations.

While the invention has been particularly shown and described with reference to a preferred embodiment, it will be understood that various changes in form and detail may be made therein without departing from the spirit, and scope of the invention.

What is claimed is:

1. A method in a network device for caching Hyper Text Transfer Protocol (HTTP) data transported in an Internet Protocol (IP) Datagram sent on a socks connection established over a Transmission Control Protocol (TCP) connection between a source port on a source device and a destination port on a destination device, said method comprising the steps of:
   identifying elements of an incoming IP Datagram, comprising:
      the source device;
      the destination device;
      the port on the source device; and
      the port on the destination device;
   determining whether the incoming IP Datagram originates from a socks client or from a socks server;
   in response to the incoming IP Datagram originating from a socks client:
      terminating the TCP connection and the socks connection;
      identifying the socks connection in a table;
      identifying the application level protocol associated with said socks connection referring to said table, said table comprising for each socks connection an application level protocol; and
      determining whether said application level protocol is HTTP or not;
      in response to said application level protocol being HTTP:
         determining whether HTTP data requested by the incoming IP Datagram resides in a local cache within the network device; and
      in response to the HTTP data requested by the incoming IP Datagram residing in a local cache:
         building an outgoing IP Datagram comprising requested HTTP data retrieved from the local cache; and
         sending said outgoing IP Datagram to the socks client originator of the incoming IP Datagram.

2. The method according to claim 1, wherein:
   in response to the HTTP data requested by the IP Datagram not residing in the local cache within the network device:
      identifying the outbound socks connection associated with the socks connection referring to the table, said table comprising for each socks connection an outbound socks connection;
      building an outgoing IP Datagram with information comprised in the incoming IP Datagram; and
      sending said outgoing IP Datagram on the outbound socks connection.

3. The method according to claim 2, wherein said step of identifying the outbound socks connection associated with the socks connection referring to the table comprises the further steps of:
   defining an outbound socks connection between the network device and the destination device of the incoming IP Datagram; and
   associating in the table said outbound socks connection with the socks connection of the incoming IP Datagram.

4. The method according to claim 2, wherein:
   in response to the incoming IP Datagram not originating from a socks server:
      terminating the TCP connection and the socks connection;
      identifying the socks connection in the table;
      identifying the application level protocol associated with said socks connection referring to said table; and
      determining whether said application level protocol is HTTP; and
      in response to said application level protocol being HTTP:
         caching HTTP data comprised in incoming IP Datagram in the local cache of the network device;
         identifying the inbound socks connection associated with the socks connection referring to the table, said table comprising for each socks connection an inbound socks connection;
         building an outgoing IP Datagram with information comprised in the incoming IP Datagram; and
         sending said outgoing IP Datagram on the inbound socks connection.

5. The method according to claim 2, wherein said IP Datagram comprises a Source IP Address field and a Destination IP Address field in an IP header for identifying the source device and the destination device, and a Source Port Address field and a Destination Port Address field in a Transmission Control Protocol (TCP) header for identifying the source port and the destination port on said source device and destination device.

6. The method according to claim 1, wherein said step of identifying the socks connection in a table, comprises the further steps of:

determining whether the IP Datagram comprises a message for establishing a new socks connection, in particular a socks CONNECT message, or not; and if the incoming IP Datagram comprises a message for establishing a new socks connection, in particular a socks CONNECT message:

defining an inbound socks connection between the socks client source of the incoming IP Datagram and the network device; and updating the table with:

an identification of the socks connection;

an identification of the associated inbound socks connection; and the application level protocol associated with the socks connection.

7. The method according to claim 1, wherein the step of determining whether the IP Datagram is originated by a socks client or a socks server comprises the step of:

determining if the value of the Destination Port field comprised in the IP Datagram is equal to the value of a destination port on a socks server or if the value of the Source Port field comprised in the IP Datagram is equal to the value of a source port on a socks server.

8. The method according to claim 1, wherein said table is dynamic and comprises for each socks connection:

an identification of the inbound socks connection;

an identification of the associated outbound connection; and an. identification of the application level protocol used in IP Datagrams using said socks connection.

9. The method according to claim 1, wherein said table comprises:

for identifying each inbound socks connection:

an inbound source device address identifying the source device of the inbound socks connection;

an inbound source port address identifying the source port of the inbound socks connection;

an inbound destination device address identifying the destination device of the inbound socks connection; and an inbound destination port address identifying the destination port of the inbound socks connection; and for identifying each outbound socks connection:

an outbound source device address identifying the source device of the outbound socks connection;

an outbound source application address identifying the source port of the outbound socks connection;

an outbound destination device address identifying the destination device of the outbound socks connection; and an outbound destination application address identifying the destination port of the outbound socks connection.

10. A data processing system in a network device for caching Hyper Text Transfer Protocol (HTTP) data transported in an Internet Protocol (IP) Datagram sent on a socks connection established over a Transmission Control Protocol (TCP) connection between a source port on a source device and a destination port on a destination device, the data processing system comprising:

first identifying means for identifying elements of an incoming IP Datagram, comprising:

the source device;

the destination device;

the port on the source device; and the port on the destination device;

first determining means for determining whether the incoming IP Datagram originates from a socks client or from a socks server;

in response to the incoming IP Datagram originating from a socks client:

first terminating means for terminating the TCP connection and the socks connection;

second identifying means for identifying the socks connection in a table;

third identifying means for identifying the application level protocol associated with said socks connection referring to said table, said table comprising for each socks connection an application level protocol; and second determining means for determining whether said application level protocol is HTTP or not;

in response to said application level protocol being HTTP:

third determining means for determining whether HTTP data requested by the incoming IP Datagram resides in a local cache within the network device; and in response to the HTTP data requested by the incoming IP Datagram residing in a local cache:

first building means for building an outgoing IP Datagram comprising requested HTTP data retrieved from the local cache; and first sending means for sending said outgoing IP Datagram to the socks client originator of the incoming IP Datagram.

11. The data processing system of claim 10, wherein:

in response to the HTTP data requested by the IP Datagram not residing in the local cache within the network device:

fourth identifying means for identifying the outbound socks connection associated with the socks connection referring to the table, said table comprising for each socks connection an outbound socks connection;

second building means for building an outgoing IP Datagram with information comprised in the incoming IP Datagram; and second sending means for sending said outgoing IP Datagram on the outbound socks connection.

12. The data processing system of claim 11, wherein said step of identifying the outbound socks connection associated with the socks connection referring to the table comprises the further steps of:

defining means for defining an outbound socks connection between the network device and the destination device of the incoming IP Datagram; and associating means for associating in the table said outbound socks connection with the socks connection of the incoming IP Datagram.

13. The data processing system of claim 11, wherein:

in response to the incoming IP Datagram not originating from a socks server:

second terminating means for terminating the TCP connection and the socks connection;

fifth identifying means for identifying the socks connection in the table;

sixth identifying means for identifying the application level protocol, associated with said socks connection referring to said table; and fourth determining means for determining whether said application level protocol is HTTP; and in response to said application level protocol being HTTP:
  caching means for caching HTTP data comprised in incoming IP Datagram in the local cache of the network device;
  seventh identifying means for identifying the inbound socks connection associated with the socks connection referring to the table, said table comprising for each socks connection an inbound socks connection;
  third building means for building an outgoing IP Datagram with information comprised in the incoming IP Datagram; and
  third sending means for sending said outgoing IP Datagram on the inbound socks connection.

14. The data processing system of claim 11, wherein said IP Datagram comprises a Source IP Address field and a Destination IP Address field in an IP header for identifying the source device and the destination device, and a Source Port Address field and a Destination Port Address field in a Transmission Control Protocol (TCP) header for identifying the source port and the destination port on said source device and destination device.

15. The data processing system of claim 10, wherein said step of identifying the socks connection in a table, comprises the further steps of:
  fourth determining means for determining whether the IP Datagram comprises a message for establishing a new socks connection, in particular a socks CONNECT message, or not; and
  if the incoming IP Datagram comprises a message for establishing a new socks connection, in particular a socks CONNECT message:
    defining means for defining an inbound socks connection between the socks client source of the incoming IP Datagram and the network device; and
    updating means for updating the table with:
      an identification of the socks connection;
      an identification of the associated inbound socks connection; and
      the application level protocol associated with the socks connection.

16. The data processing system of claim 10, wherein the step of determining whether the IP Datagram is originated by a socks client or a socks server comprises the step of:
  fourth determining means for determining if the value of the Destination Port field comprised in the IP Datagram is equal to the value of a destination port on a socks server or if the value of the Source Port field comprised in the IP Datagram is equal to the value of a source port on a socks server.

17. The data processing system of claim 10, wherein said table is dynamic and comprises for each socks connection:
  first identification means for an identification of the inbound socks connection;
  second identification means for an identification of the associated outbound connection; and
  third identification means for an identification of the application level protocol used in IP Datagrams using said socks connection.

18. The data processing system of claim 10, wherein said table comprises:
  for identifying each inbound socks connection:
    fourth identifying means for an inbound source device address identifying the source device of the inbound socks connection;
    fifth identifying means for an inbound source port address identifying the source port of the inbound socks connection;
    sixth identifying means for an inbound destination device address identifying the destination device of the inbound socks connection; and
    seventh identifying means for an inbound destination port address identifying the destination port of the inbound socks connection; and
  for identifying each outbound socks connection:
    eighth identifying means for an outbound source device address identifying the source device of the outbound socks connection;
    ninth identifying means for an outbound source application address identifying the source port of the outbound socks connection;
    tenth identifying means for an outbound destination device address identifying the destination device of the outbound socks connection; and
    eleventh identifying means for an outbound destination application address identifying the destination port of the outbound socks connection.

19. A computer program product residing on a computer readable medium having computer readable code means for caching Hyper Text Transfer Protocol (HTTP) data transported in an Internet Protocol (IP) Datagram sent on a socks connection established over a Transmission Control Protocol (TCP) connection between a source port on a source device and a destination port on a destination device, said computer readable code means comprising the steps of:
  identifying elements of an incoming IP Datagram, comprising:
    the source device;
    the destination device;
    the port on the source device; and
    the port on the destination device;
  determining whether the incoming IP Datagram originates from a socks client or from a socks server;
  in response to the incoming IP Datagram originating from a socks client;
    terminating the TCP connection and the socks connection;
    identifying the socks connection in a table;
    identifying the application level protocol associated with said socks connection referring to said table, said table comprising for each socks connection an application level protocol;
    determining whether said application level protocol is HTTP or not;
  in response to said application level protocol being HTTP:
    determining whether HTTP data requested by the incoming IP Datagram resides in a local cache within the network device; and
  in response to HTTP data requested by the incoming IP Datagram residing in a local cache:
    building an outgoing IP Datagram comprising requested HTTP data retrieved from the local cache; and
    sending said outgoing IP Datagram to the socks client originator of the incoming IP Datagram.

20. The computer program product according to claim 19, wherein:
  in response to HTTP data requested by the IP Datagram not residing in the local cache within the network device:
    identifying the outbound socks connection associated with the socks connection referring to the table, said table comprising for each socks connection an outbound socks connection;
    building an outgoing IP Datagram with information comprised in the incoming IP Datagram; and
    sending said outgoing IP Datagram on the outbound socks connection.

* * * * *

UNITED STATES PATENT AND TRADEMARK OFFICE
CERTIFICATE OF CORRECTION

PATENT NO. : 6,938,088 B1
DATED : August 30, 2005
INVENTOR(S) : Hericourt

It is certified that error appears in the above-identified patent and that said Letters Patent is hereby corrected as shown below:

Column 14,
Line 56, before "Port field" delete "In_Source Port=Source" and insert
-- In_Source_Port=Source --.
Line 58, before "IP address" delete "In_Dest IP_Address=Destination" and insert
-- In_Dest_IP_Address=Destination --.

Column 19,
Line 44, before "IP Address field" delete "In_Source IP_Address=Source" and insert
-- In_Source_IP_Address=Source --.

Column 20,
Line 24, delete "DT_Dest Port=Out_Dest Port" and insert
-- DT_Dest_Port=Out_Dest_Port --.

Column 22,
Line 3, delete "DT_Source IP_Address=In Destination" and insert
-- DT_Source_IP_Address=In_Destination --.
Line 5, delete "DT_Source Port=In Destination Port" and insert
-- DT_Source_Port=In_Destination_Port --.
Line 6, delete "DT_Dest IP_Address=In_Source IP_Address" and insert
-- DT_Dest_IP_Address=In_Source_IP_Address --.
Line 7, delete "DT_Dest Port=In_Source Port" and insert
-- DT_Dest_Port=In_Source_Port --.

Column 25,
Line 29, after "an" delete ".".

Signed and Sealed this

Third Day of January, 2006

JON W. DUDAS
*Director of the United States Patent and Trademark Office*